(12) United States Patent
Lewis et al.

(10) Patent No.: US 6,542,486 B1
(45) Date of Patent: Apr. 1, 2003

(54) MULTIPLE TECHNOLOGY VOCODER AND AN ASSOCIATED TELECOMMUNICATIONS NETWORK

(75) Inventors: Larry D. Lewis, Garland, TX (US); Jerry L. Mizell, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/218,985

(22) Filed: Dec. 22, 1998

(51) Int. Cl.[7] .............................................. H04B 7/216
(52) U.S. Cl. ...................................... 370/335; 370/465
(58) Field of Search ................................ 370/320, 329, 370/331, 335, 328, 465, 466, 468, 470, 477, 357, 286–287, 395, 441, 442, 342, 347, 428, 461, 402, 321, 337, 336; 455/509, 510, 515, 67.1, 422, 450, 452, 455, 458, 560, 563

(56) References Cited

U.S. PATENT DOCUMENTS

| | | | |
|---|---|---|---|
| 4,237,537 A | | 12/1980 | Pitches et al. |
| 4,245,730 A | | 1/1981 | Bachmann et al. |
| 4,766,548 A | | 8/1988 | Cedrone et al. |
| 5,091,713 A | | 2/1992 | Horne et al. |
| 5,257,179 A | | 10/1993 | DeMar |
| 5,280,472 A | * | 1/1994 | Gilhousen et al. ............ 370/18 |
| 5,367,452 A | | 11/1994 | Gallery et al. |
| 5,450,938 A | | 9/1995 | Rademacher |
| 5,452,344 A | | 9/1995 | Larson |
| 5,613,620 A | | 3/1997 | Center et al. |
| 5,701,252 A | | 12/1997 | Facchin et al. |
| 5,726,983 A | * | 3/1998 | Bakke et al. ................ 370/337 |
| 5,751,718 A | * | 5/1998 | Yip et al. .................... 370/468 |
| 5,778,024 A | * | 7/1998 | McDonough ................ 375/216 |
| 5,778,338 A | * | 7/1998 | Jacobs et al. ................ 704/223 |
| 5,790,527 A | * | 8/1998 | Janky et al. ................. 370/330 |
| 5,815,525 A | * | 9/1998 | Smith et al. ................. 375/295 |
| 5,881,053 A | * | 3/1999 | Kimball ....................... 370/260 |
| 5,898,696 A | * | 4/1999 | Proctor et al. ............... 370/468 |
| 5,953,331 A | * | 9/1999 | Duncan et al. .............. 370/352 |
| 5,982,782 A | * | 11/1999 | Sasamoto .................... 370/465 |
| 6,138,022 A | * | 10/2000 | Strawczynski et al. ...... 455/445 |
| 6,172,974 B1 | * | 1/2001 | Tseng et al. ................. 370/357 |
| 6,198,730 B1 | * | 3/2001 | Hogberg et al. ............. 370/320 |
| 6,205,125 B1 | * | 3/2001 | Proctor et al. ............... 370/328 |

FOREIGN PATENT DOCUMENTS

| | | |
|---|---|---|
| EP | 0750441 A1 | 12/1996 |
| JP | 10289372 | 10/1998 |

OTHER PUBLICATIONS

Harry Newton, Newton's Telecom Dictionary, published by Telecom Books, 1998, p. 825.*

(List continued on next page.)

*Primary Examiner*—Dang Ton
(74) *Attorney, Agent, or Firm*—Haynes and Boone, LLP

(57) ABSTRACT

A wireless telecommunications network includes a base station controller which, in turn, is comprised of a call control resource manager and a multiple technology vocoder having first and second interfaces, first and second selection managers, a vocoder controller and first, second, third, fourth and fifth resources, each embodied as a software module, for performing D/A and A/D conversions on messages configured in accordance with EVRC, EFRC, RLP, VSELP and QCELP protocols, respectively. When transferring messages between a mobile terminal and an MSC via the base station controller, the mobile terminal first informs the call control resource manager of the protocol to which the message conforms. In turn, the call control resource manager advises of the vocoder controller of the protocol type for the incoming message. The vocoder controller configures the interfaces to accept messages formatted in the protocol and instructs the selection managers to provide a path, for the received message, to the appropriate resource for conversion. The converted message is then returned to the call control resource manager and transmitted on to its final destination.

18 Claims, 2 Drawing Sheets

OTHER PUBLICATIONS

U.S. patent appllication No. 08/954,686; Filed: Oct. 20, 1997; Entitled: Channel Coding and Interleaving for Transmission on a Multicarrier System; by Ahmad Jalali.

Allan Z. Gilbert, "A Call to Action for Wireless Data Communication", Automatic Merchandiser, Aug. 1996, Financial Management section pp. 62–64.

"VendMaster Windows for Vending Reports", VendMaster, (http://www.vendmaster.com/reports$_{13}$main.html), download date: Feb. 6, 1998.

"VendMaster Window for Vending News", VendMaster, (http://www.vendmaster.com/news$_{13}$main.html)), download date: Feb. 6, 1998.

* cited by examiner

MULTIPLE TECHNOLOGY VOCODER AND AN ASSOCIATED TELECOMMUNICATIONS NETWORK

TECHNICAL FIELD

The invention relates generally to telecommunication networks and, more particularly, to a vocoder capable of performing conversions for decoding functions for messages conforming to various transmission standards.

BACKGROUND OF THE INVENTION

Wireless communications is characterized by plural communication standards, each of which are used by certain components and/or segments of a wireless telecommunications to define the operating environment under which messages are transmitted with that component and/or segment. Time Division Multiple Access (or "TDMA") is a technology standard used to separate multiple conversation transmissions by allocating a discrete amount of frequency bandwidth to each user. In a TDMA digital wireless telephone system, three time slots are allocated within each frequency channel. A user is assigned a specific time slot within a frequency channel for transmissions. During the assigned time slot, the cellular telephone send bursts of information, each consisting of a portion of an encoded voice message. These bursts of information, commonly referred to as data packets, are then reassembled by the receiving equipment into the original voice message. Similar to TDMA, Frequency Division Multiple Access (or "FDMA") is a technology standard which also separates multiple transmissions over a finite frequency allocation. In a FDMA digital wireless telephone system, each user is allocated an exclusive frequency band within a transmission channel. When the user completes their transmission, the band is reused by assigning it to a next user. Code Division Multiple Access (or "CDMA"), on the other hand, is a spread spectrum technology standard. In a CDMA digital wireless telephone system, a voice message is divided into a collection of speech bits, each of which is assigned a code. The encoded speech bits are scrambled and then transmitted over the air. Receiving equipment reassembles the original voice message from the received collection of scrambled speech bits.

Further complicating the situation is that broadly defined technical standards such as TDMA and CDMA typically encompass a variety of protocols. For example, the TDMA technical standard encompasses, among others, the Enhanced Full Rate Coding (or "EFRC") protocol and the Vector Sum Excited Linear Prediction Coding (or "VSELP") protocol while the CDMA technical standard encompasses, among others, the Enhanced Variable Rate Coding (or "EVRC") protocol and the Qualcomm Code Excited Linear Predication (or "QCELP") protocol. Finally, a digital wireless telephone system may conform to the Global System for Mobile Communications (or "GSM") technical standard, which uses a mixed TDMA and FDMA access method. Finally, wireless transmissions of data are often conducted asynchronously, for example, using Radio Link Protocol (or "RLP").

Within a wireless communications system, messages transmitted over the airlink, for example, messages exchanged between a mobile terminal and a base station, are digitally encoded while messages transmitted elsewhere within the communications system, for example, messages exchanged between the base station and the mobile switching center (or "MSC") are analog messages. Thus, the base station must be equipped for both digital-to-analog (or "D/A") decoding and analog-to-digital (or "A/D") encoding operations. However, D/A and A/D operations are different for each access technology standard such as TDMA, CDMA, FDMA and GSM, as well as for the various protocols which fall within a particular access technology standard.

Thus, the base station controller and other components of digital wireless telephone systems have been faced with the problem of receiving messages which conform to various access technologies, each having distinct encoding and decoding operations. To handle messages of different access technologies, base station controllers have been provided with separate vocoder resources, one for each access technology to be handled thereby. For example, while a base station controller would have a local vocoder equipped with a single resource for handling encoding and decoding operations in one access technology, messages configured in accordance with other access technologies were often shunted elsewhere within the wireless telecommunications network for handling. For example, an interworking function (or "IWF") coupled to the base station controller is often used to encode and/or decode facsimile data by converting received digital fax data into analog modem tones and converting received analog modem tones into digital fax data.

It is, therefore, the object of this invention to provide a base station controller equipped with a multiple technology vocoder.

SUMMARY OF THE INVENTION

In one embodiment, the present invention is a base station controller which includes a call control resource manager which controls exchanges of messages between mobile terminals and a MSC. Messages received by the call control resource manager are transferred to a multiple technology vocoder coupled thereto for D/A or A/D conversion. To perform conversions, the multiple technology vocoder includes a first resource module for performing D/A and A/D conversions for messages configured in accordance with a first technology, a second resource module for performing D/A and A/D conversions for messages configured in accordance with a second technology and a selection manager for selecting one of said first and second resource modules to perform D/A and A/D conversions on the messages received from said call resource manager. In one aspect, the selection manager selects a resource module in response to a first control signal issued by a vocoder controller. In another, a buffer manager regulates the transmission of messages from the call control resource manager to the selection manager in response to a second control signal issued by the vocoder controller. In still other aspects, the first technology is TDMA, the second technology is CDMA and the multiple technology vocoder is embodied within a DSP (digital signal processor).

In another embodiment, the present invention is directed to a base station controller which includes a call control resource manager for controlling exchanges of messages between a mobile terminal and a MSC and a vocoder having a first interface coupled to receive, from the call control resource manager, messages originating at the mobile terminal and destined for the MSC, a second interface coupled to receive, from the call control resource manager, messages originating at the MSC and destined for the mobile terminal, a first resource module, coupled to the first and second interfaces, for performing D/A and A/D conversions for messages configured in accordance with a first protocol, a second resource module, coupled to the first and second interfaces, for performing D/A and A/D conversions for messages configured in accordance with a second protocol and a vocoder controller, coupled to the call control resource manager and the first and second interfaces, for configuring the first and second interfaces to handle messages of a selected one of the first and second protocols in response to information received from the call control resource manager.

In one aspect of this embodiment of the invention, the first interface further includes a reconfigurable buffer and a buffer manager which reconfigures the buffer to accept messages formatted in a selected one of the first and second protocols each time the vocoder controller detects a change in protocol. In another, the second interface is similarly constructed. In still others, the vocoder may further include a first selection manager for selecting one of the first and second resource modules to perform D/A conversions on messages originating at the mobile terminal and destined for the MSC and a second selection manager for selecting one of the first and second resource modules to perform A/D conversions on messages originating at the MSC. Each of the selection managers provide a path to the selected one of the first and second resource modules. The first and second protocols may be comprised of two TDMA protocols, two CDMA protocols, one TDMA protocol and one CDMA protocol, one TDMA protocol and one radio link protocol or one CDMA protocol and one radio link protocol.

In still another embodiment, the present invention is of a telecommunication network which includes a mobile terminal, first and second base station controllers and a MSC. The first base station controller includes a vocoder for performing D/A and A/D conversions for messages configured in accordance with a first protocol while the second base station controller includes a vocoder for performing D/A and A/D conversions for messages configured in accordance with a second protocol but is incapable of performing D/A and A/D conversions for messages configured in accordance with the first protocol. When the mobile terminal is coupled to the first base station controller via a first airlink, messages being exchanged between the mobile terminal and the MSC via the first base station controller are converted by the vocoder residing at the first base station controller. When the mobile terminal is coupled to the second base station controller via a second airlink, messages being exchanged between the mobile terminal and the MSC via the second base station controller are shunted, by the second base station controller, to the first base station controller via a direct link therebetween for conversion by the vocoder residing at the first base station controller.

BRIEF DESCRIPTION OF THE DRAWINGS

The invention will be better understood, and its numerous objects and advantages will become apparent to those skilled in the art, by reference to the following drawings, in which.

DETAILED DESCRIPTION

Figure 1:
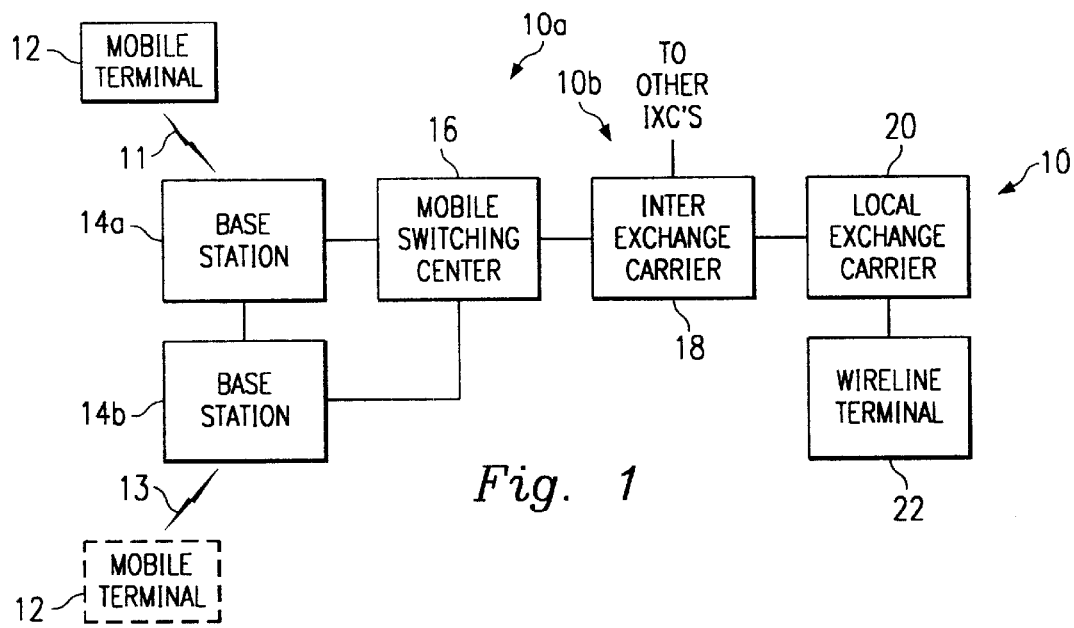
FIG. 1 is a block diagram of a telecommunications network constructed in accordance with the teachings of the present invention and having a first base station controller configured for conducting vocoder operations in multiple technologies incorporated therein.

Referring first to FIG. 1, the reference numeral 10 designates a telecommunications network 10. As illustrated herein, the telecommunications network 10 includes a digital wireless telephone system 10a, for example, a cellular network and a wireline system 10b, for example, the public switched telephone network ("PSTN"). The digital wireless telephone system 10a of the telecommunications network 10 further includes a mobile terminal 12 which, for example, may be a voice terminal such as a mobile digital cellular telephone. As will be more fully described below, the mobile terminal 12 is configured to generate and receive digital data signals configured in accordance with a first technology standard such as the TDMA standard.

The digital wireless telephone system 10a of the telecommunications network 10 also includes a first base station 14a to which the mobile terminal 12 is coupled by a first airlink 11 and a second base station 14b to which the mobile terminal 12 is coupled to, at a later point in time, by a second airlink 13. While the digital wireless telephone system 10a illustrated in FIG. 1 shows only the first and second base stations 14a and 14b, it should be clearly understood that digital wireless telephone systems typically include many more base stations. As will be more fully described below, the first base station 14a handles exchanges of information between the mobile terminal 12 and a MSC 16 coupled thereto. The MSC 16 directs received information to its destination which, for example, may be a second wireless terminal (not shown) coupled to the MSC 16 (via either the first base station 14a, the second base station 14b or another base station not shown in the drawings), a wireless terminal coupled to a second MSC (also not shown), or, as illustrated herein, to a wireline terminal 22 located within the PSTN and coupled to the MSC 16 by an interexchange carrier (or "IXC") 18 and a local exchange carrier (or "LEC") 20. As illustrated herein, the wireline terminal 22, like the mobile terminal 12, is a voice terminal such as a telephone. Of course, while the wireline terminal 22 is shown as the destination of the voice signal originating at the mobile terminal 12, it should be further understood that the analog voice signal may be directed via other IXCs (not shown) and LECs (also not shown) of the PSTN to any of the multitude of wireline terminals included as part of the PSTN. Furthermore, in alternate configurations of the telecommunications network 10, the digital wireless telephone network 10a may be either a cellular or personal communication service ("PCS") system while the wireline portion thereof may be the PSTN. Of course, the telecommunications network 10 may further include plural wireless systems of the aforementioned or other types as well as additional wireline systems, for example, private networks.

Figure 2:
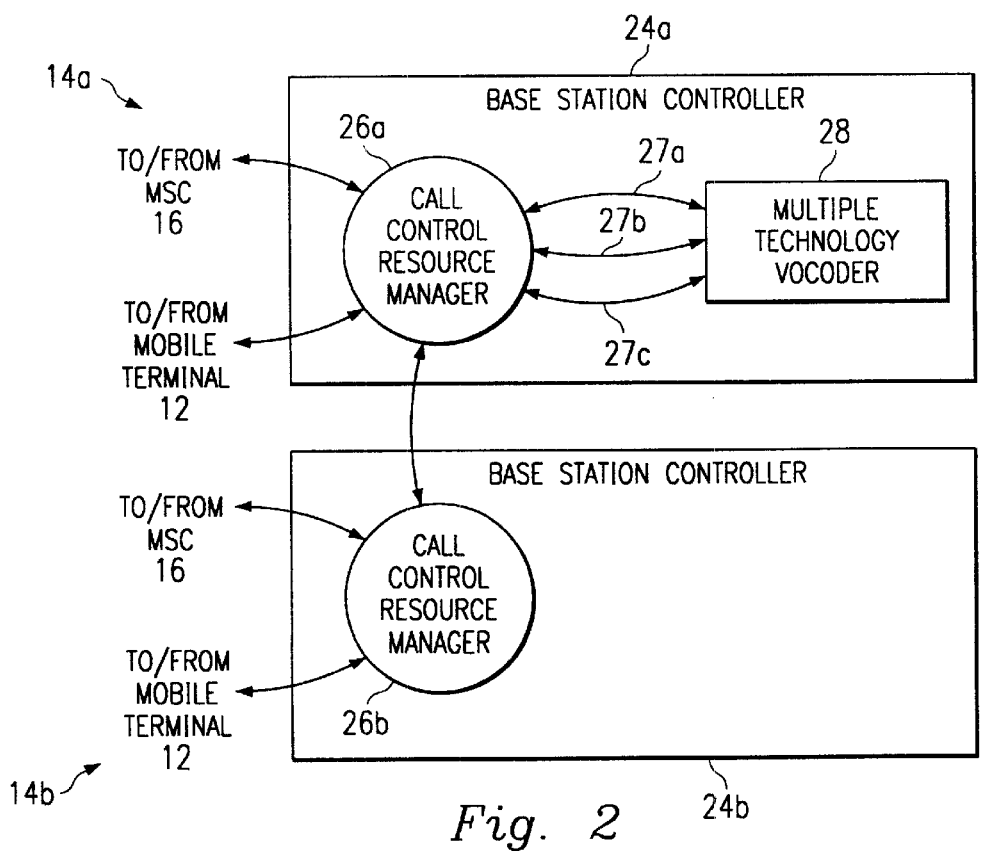
FIG. 2 is an expanded block diagram of the first and second base station controllers of FIG. 1.

Referring next to FIG. 2, a first base station controller 24a which forms part of the first base station 14a of FIG. 1 and which incorporates a multiple technology vocoder 28 will now be described in greater detail. As may now be seen, the first base station controller 24a includes a first call control resource manager (or "CCRM") 26a which handles the transfer of messages between the mobile terminal 12 and the MSC 16. Preferably, the first CCRM 26a is a software module which resides within the first base station 14a and is executable by the first base station controller 24a. The first base station controller 24a also includes a multiple technology vocoder 28 which, as will be more fully described below, performs decoding and encoding operations such as D/A and A/D conversions on messages received by the first base station controller 14a. In a preferred embodiment of the invention, and as better shown in FIG. 3, the multiple technology vocoder 28 is embodied within a digital signal processor (or "DSP") 29 forming part of the first base station controller 24a.

Figure 3:
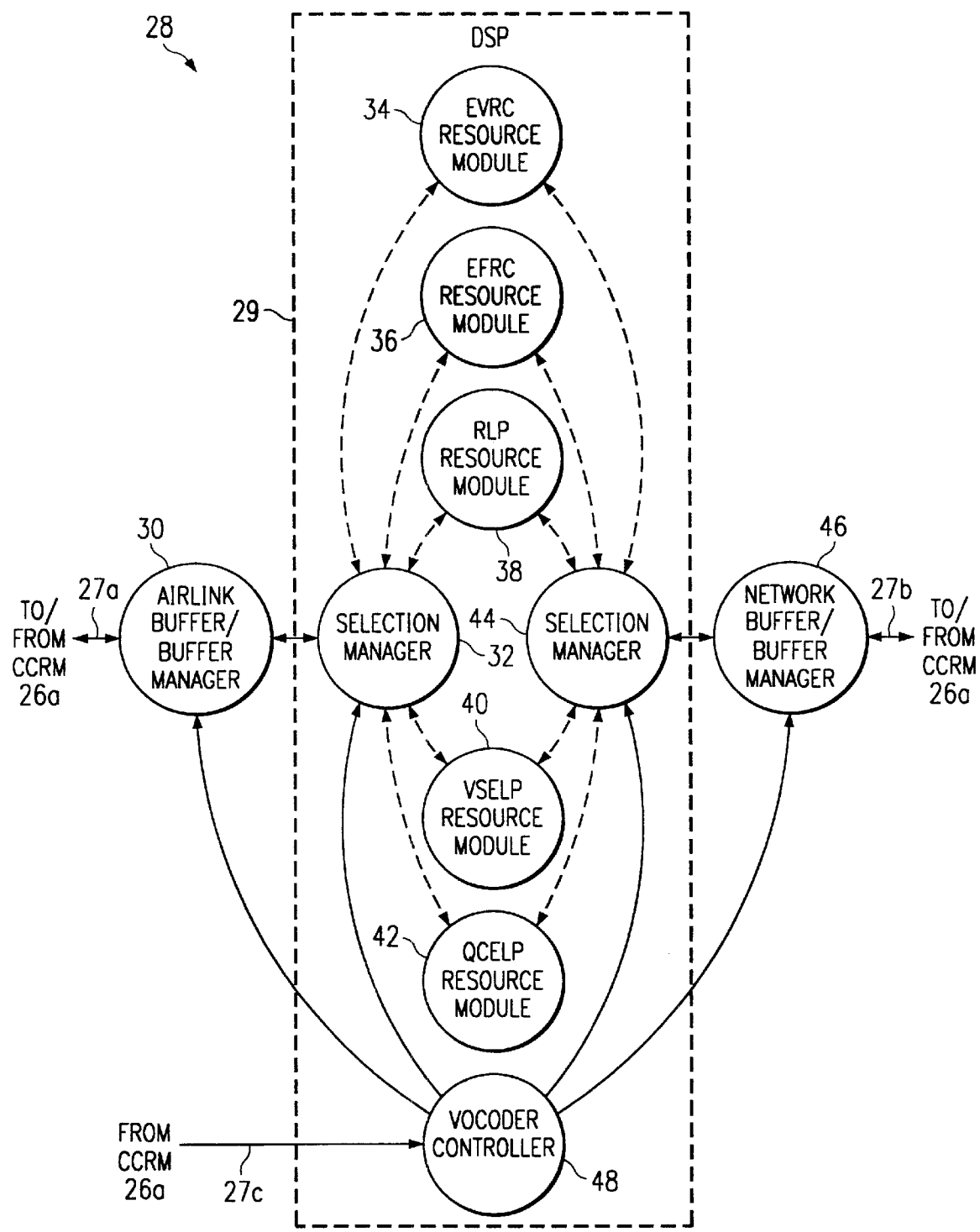
FIG. 3 is an expanded block diagram of the multiple technology vocoder of FIG. 2.

Referring next to FIG. 3, the multiple technology vocoder 28 is comprised of an airlink buffer/buffer manager 30, a first selection manager 32, a series of vocoder resource modules 34, 36, 38, 40 and 42, a second selection manager 44, a network buffer/buffer manager 46 and a vocoder controller 48. As disclosed herein, five vocoder resource modules are disclosed. It should be clearly understood, however, that any number of vocoder resource modules may be provided. Each of the first, second, third, fourth and fifth vocoder resources 34, 36, 38, 40 and 42 are software modules which, like the first CCRM 26a, preferably reside within the first base station controller 24a and are executable by the DSP 29 or other processor in which the multiple technology vocoder 28 is embodied. Of course, it is entirely contemplated that the first CCRM 26a, the first vocoder resource 34, the second vocoder resource 36, the third vocoder resource 38, the fourth vocoder resource 40 and the fifth vocoder resource 42 may all be stored in a common memory subsystem for the first base station controller 24a and be executable by a common processor subsystem for the first base station controller 24a.

The airlink and network buffer/buffer managers 30 and 46 buffer messages received by the multiple technology vocoder 28 from the first CCRM 26a along lines 27a and 27b, respectively. Generally, depending upon the particular protocol and/or access technology standard with which a voice, data or other type of message complies, the message may have frame size and timing requirements which differ from those of a voice, data or other type of message which complies with a different protocol and/or technology standard. Thus, the multiple technology vocoder 28 must be equipped to accept differently sized messages at different rates.

To accomplish this objective, both of the airlink buffer/buffer manager 30 and the network buffer/buffer manager 46 is comprised of a reconfigurable buffer and a buffer manager. Prior to the arrival of an incoming message, the vocoder controller 48 will instruct the buffer managers of both the airlink buffer and the network buffer of the size and timing characteristics of the incoming message. In turn, the buffer manager will reconfigure the buffer associated therewith to accept messages having the indicated frame size. The term "reconfigurable" is intended to refer to the characteristic that, while originally comprised of an undivided memory space, the buffers may be repeatedly subdivided into a series of data blocks, each sized to accept a data frame of a specified size, chained together, for example, in a First-In-First-Out (or "FIFO") arrangement so that, whenever the selected resource module has processed a data frame, the buffer may transmit the next data frame received thereby towards the selected resource module.

As disclosed herein, both the reconfigurable buffer and the associated buffer manager are shown to be located external to the DSP 29 in which the first and second selection managers 32 and 44, the plural resource modules 34 through 42 and the vocoder controller 48 reside as executable software instructions. It is fully contemplated, however, that the buffer manager portions thereof may also reside within the DSP 29 as a set of executable instructions. The airlink and network buffers, on the other hand, are pre-allocated portions of the memory subsystem of the first base station controller 24a. Likewise, the instruction sets which comprise the various managers and/or modules may also reside within the memory subsystem of the base station controller 24a where they may be called, by the vocoder controller 48, for execution thereof by the DSP 29.

The first and second selection managers 32 and 44 are coupled between the airlink buffer/buffer manager 30 and the network buffer/buffer manager 46, respectively, and the plural vocoder resource modules 34, 36, 38, 40 and 42. Prior to the arrival of an incoming message, the vocoder controller 48 will instruct the first and second selection managers 32 and 44 of the type of message which is to be received thereby. Based upon the information received from the vocoder controller 48, the first and second selection managers 32 and 44 will determine which one of the resource modules 34 through 42 is needed to perform the forthcoming D/A and/or A/D operations. After selecting one of the resource modules 34 through 42, the selection manager will then provide a path to the selected one of the resource modules 34 through 42.

In alternate embodiments of the invention, it is contemplated that the "path" to the selected resource modules maybe provided using a variety of techniques. For example, upon receipt of a data frame from the airlink buffer, the first selection manager 32 may issue a call to the selected one of the resource managers 34 through 48. The first selection manager 32 then executes the code contained in the selected resource module to perform a D/A conversion on the received data frame. The first selection manger 32 would then transfer the converted data frame to the second selection manager 44 who passes it on to the network buffer. Alternately, the resource modules 34 through 42 may each be comprised of a set of independently executable instructions. In this embodiment, upon receipt of a data frame from the airlink buffer, the first selection manager 32 would transfer the data frame to the selected one of the resource managers 34 through 48. The selected one of the resource modules would convert the received frame of digital data into a frame of analog data and then transfer the analog data frame to the second selection manager 44 who, again, would pass it on to the network buffer.

As may be further seen in FIG. 3, the first vocoder resource module 34 is an EVRC resource module which contains the code necessary to perform D/A and A/D conversions of voice messages which comply with the EVRC protocol, a protocol which complies with the CDMA technical standard. The second vocoder resource module 34 is a EFRC resource module 36 which contains the code necessary to perform D/A and A/D conversions of voice messages which comply with the EFRC protocol, a protocol which complies with the TDMA technical standard. The third vocoder resource module 38 is a RLP resource module which contains the code necessary to perform D/A and A/D conversions of data messages which comply with RLP, an asynchronous data protocol. The fourth vocoder resource module 40 is a VSELP resource module which contains the code necessary to perform D/A and A/D conversions of voice messages which comply with the VSELP protocol, a protocol which complies with the TDMA standard. Finally, the fifth vocoder resource module 42 is a QCELP resource module which contains the code necessary to perform D/A and A/D conversions of voice messages which comply with the QCELP protocol, a protocol which complies with the CDMA technical standard. Of course, the particular protocols and/or standards for which the various vocoder resource modules 34 through 42 are equipped to perform D/A and A/D conversions of data conforming therewith are purely exemplary and that the vocoder resource modules 34 through 42 may instead be configured to perform D/A and A/D conversions of data conforming to protocols and/or technical standards other than those specifically enumerated herein.

Continuing to refer to FIG. 3, the method by which the multiple technology vocoder 28 performs D/A and A/D conversions on incoming messages will now be described in greater detail. First, the type, i.e., the protocol and/or technical standard to which the message conforms, of message incoming to the first base station controller 24a is determined. When establishing a connection between the mobile terminal 12 and a destination terminal, for example, the wireline terminal 22 coupled to the MSC 16 by IXC 18 and LEC 20, the mobile terminal 12 first issues a request for connection to the first base station controller 24a of the first base station 14a. The initial request will include a variety of information regarding the message to be received, including its type. For example, the first CCRM 26a may be advised that the incoming message is a EVRC/CDMA voice message. Conversely, if the originating terminal is the wireline terminal 22 and the destination terminal is the mobile terminal 23, the initial request for connection will originate at the LEC 20, from where it will proceed to the IXC 18, the MSC 16 and on to the first base station controller 24a.

Whether originating at the mobile terminal 12 or the MSC 16, the request for connection is received, within the first base station controller 24a, by the first CCRM module 26a. The first CCRM module 26a analyzes the received request to determine the message type for the requested connection. Upon determining the message type for the requested connection, the first CCRM 26a forwards this information to the vocoder controller 48 via line 27c.

Upon receipt of the incoming message type from the first CCRM 26a, the vocoder controller 48 issues a series of instructions to the airlink buffer/buffer manager 30, the first selection manager 32, the network buffer/buffer manager 46 and the second selection manager 44. Of course, the type of instructions issued by the vocoder controller 48 will vary based upon what information resides within the vocoder controller 48 and what information resides within the buffer managers and the first and second selection managers 32 and 44. For example, in order to reconfigure the airlink and network buffers to accept the incoming message and to ensure the orderly transmission of the incoming message through the multiple technology vocoder 28, the associated buffer manager must know frame size, timing and related information for the incoming message. However, that message may be maintained, for example, in the form of a look-up table, by either the vocoder controller 48 or the buffer managers themselves. Thus, in alternate configurations of the invention, the information transmitted to the airlink buffer/buffer manager 30 and the network buffer/buffer manager 46 may be comprised of simply the message type for the incoming message or may be comprised of frame and timing information. If only message type is provided by the vocoder controller 48, the buffer managers would, upon receipt of the message type, determine the frame and timing information for that message type and then reconfigure the buffer associated therewith so that it may handle the incoming message. Conversely, if frame and timing information is provided by the vocoder controller 48, the buffer manager will simply reconfigure the buffer associated therewith using the information provided by the vocoder controller 48.

Similarly, the vocoder controller 48 may provide the first and second selection managers 32 and 44 with either the message type for the incoming message or the name and location of a specific resource module which the selection manager is to use when performing operations on the incoming message. More specifically, in order to perform D/A and/or A/D conversion of an incoming message, the first and second selection managers 32 and 44 must provide respective paths to the appropriate resource module 34 through 42 which will perform the desired conversion. Thus, the location of each resource module and the type of messages for which the resource modules performs D/A and A/D conversions therefor must be maintained, again, for example, in the form of a look-up table. As before, however, the look-up table may be maintained by either the vocoder controller 48 or the first and second selection managers 32 and 44, themselves. Thus, in alternate configurations of the invention, the information transmitted to the first and second selection managers 32 and 44 may be comprised of simply the message type for the incoming message or may be comprised of the location of the resource module to perform the appropriate operation. If only message type is provided by the vocoder controller 48, the first and second selection managers 32 and 44 would, upon receipt of the message type, determine the location of a selected resource module which performs the D/A and A/D operations for the received message type and then provide a path to the selected resource module so that the selected resource module may perform the appropriate operation on the incoming message. Conversely, if the vocoder controller 48 selects the resource module and then simply provides the first and second selection managers 32 and 44 with the location of the selected resource module, the first and second selection managers 32 and 44 will simply provide respective paths to the received locations.

After the first CCRM 26a provides, to the vocoder controller 48, the information need to ensure that the airlink and network buffers have been properly reconfigured and that paths between the first and second selection managers 32 and 44 and the selected resource module have been provided, the first CCRM 26a will transfer the incoming message to the multiple technology vocoder 28. If the incoming message originated at the mobile terminal 12, the first CCRM 26a will forward the digital message to the airlink buffer/buffer manager 30 via line 27a where it is placed in the airlink buffer portion thereof. Conversely, if the incoming message originated at the MSC 16, the first CCRM 26a will forward the message to the network buffer/buffer manager 46 via line 27b where it is placed in the network buffer portion thereof.

From the airlink buffer portion of the airlink buffer/buffer manager 32, frames of the received digital message are clocked into, preferably in FIFO order, to the first selection manager 32 by the buffer manager portion thereof. The first selection manager 32 would then provide a path, for the received digital frame, to the selected one of the resource modules 34 through 42 where a D/A conversion of the frame would be conducted. From the selected resource module, the converted frame of analog data would follow the provided path to the second selection manager 44. In turn, the second selection manager 44 would place the frame of analog data into the network buffer portion of the network buffer/buffer manager 46 where the data frame would be clocked out, again, preferably using a FIFO technique, over the line 27b to the first CCRM 26a, by the buffer manager portion thereof.

Conversely, from the network buffer portion of the network buffer/buffer manager 46, frames of the received analog message are clocked into, preferably in FIFO order, to the second selection manager 44 by the buffer manager portion thereof. The second selection manager 44 would then provide a path, for the received digital frame, to the selected one of the resource modules 34 through 42 where an A/D conversion of the frame would be conducted. From the selected resource module, the converted frame of digital data would follow the provided path to the first selection manager 32. In turn, the first selection manager 32 would place the frame of digital data into the airlink buffer portion of the airlink buffer/buffer manager 30 where the data frame would be clocked out, again, preferably using a FIFO technique, over the line 27a to the first CCRM 26a, by the buffer manager portion thereof.

The method of the present invention ends by the first CCRM module 26a transferring the converted message to its destination terminal. For example, if the received message was an analog voice message originating at the wireline terminal 22 and received, by the first CCRM module 26a, from the MSC 16, the converted digital voice message would be transferred from the first CCRM module 26a to its final destination, the mobile terminal 12. If, on the other hand, the received message was a digital voice message received, by the first CCRM module 26a, from the mobile terminal 12, the converted analog voice message would be transferred from the first CCRM module 26a to the MSC 16. From there, it would be transferred to its final destination, for example, the wireline terminal 22.

Returning now to FIGS. 1–2, another aspect of the invention will now be described in greater detail. Heretofore, the present invention has been described as being comprised of a single base station, here, the first base station 14a, in which a multiple technology vocoder resides. It should be readily appreciated by those skilled in the art that, by providing a multiple technology vocoder, the base station is provided with numerous benefits. For example, it is contemplated that a multiple technology vocoder will greatly facilitate the ability of a base station which conforms to a particular protocol and/or technical standard to handle a roaming mobile terminal which conforms to a different protocol and/or technical standard. In this manner, interoperability of equipment may be greatly enhanced.

The continued expansion of wireless communication systems have opened other avenues from which benefits may be derived from the present invention. Specifically, the development of competing wireless networks have resulted in wireless networks which adhere to different protocols and/or technology standards having overlapping coverage areas. As a result, the possibility that a base station controller may attempt a handoff between cells which conform to different protocols and/or technology standards is seen as increasingly likely, particularly when the only alternative would be to drop the call. For example, a base station may attempt to a handoff between an EFRC/TDMA cell and a VSELP/TDMA cells or even between a TDMA cell and a CDMA cell.

A problem could arise, however, if the base station to which the mobile terminal is handed off is unable to handle messages conforming to the protocol and/or technology standard of the mobile terminal. For example, FIG. 1 shows the mobile terminal 20 coupled to the first base station 14a via the airlink 11. Should, however, the mobile terminal 20 move outside the coverage area of the first base station 14a, for example, by moving to the position shown in phantom in FIG. 1, the first base station 14a would use conventional techniques to attempt to handoff the mobile terminal 12 to the second base station 14b. In registering the mobile terminal 12, second CCRM 26b of second base station controller 24b may discover that it lacks a vocoder capable of handling the protocol and/or technology standard for the mobile terminal 12. Instead of dropping the call or consuming time seeking an IWF somewhere within the network 10, knowing that the first CCRM 26a was capable of handling the protocol and/or technology standard, the second CCRM 26b may simply transfer incoming messages originating at or destined for the mobile terminal 12 to the first CCRM 26a where D/A and/or A/D conversion processes may be conducted in the manner previously described. The converted message is then returned to the CCRM 26b for transmission to its final destination.

Thus, there has been described and illustrated herein, a telecommunications network characterized by incorporation, within the base station controller thereof, a multiple technology vocoder capable of performing D/A and A/D conversions for messages which conform to various protocols and/or technology standards. However, those skilled in the art should recognize that, although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A base station controller, comprising:
   a call control resource manager, said call control resource manager controlling exchanges of messages between at least one mobile terminal and a MSC;
   a reconfigurable buffer operable to receive messages from said call control resource manager;
   a multiple technology vocoder coupled to said call control resource manager and said reconfigurable buffer, said multiple technology vocoder receiving, from said reconfigurable buffer, messages being exchanged between said at least one mobile terminal and said MSC;
   said multiple technology vocoder comprising:
      a first resource module for performing D/A and A/D conversions for messages configured in accordance with a first technology;
      a second resource module for performing D/A and A/D conversions for messages configured in accordance with a second technology; and
      a selection manager for selecting one of said first and second resource modules to perform D/A and A/D conversions on messages received from said call resource manager; and
   a buffer manager accessible to said reconfigurable buffer and said multiple technology vocoder, said buffer manager operable to configure said reconfigurable buffer to accept messages configured in accordance with either said first or second technology when so instructed by said multiple technology vocoder.

2. The base station controller of claim 1, wherein said multiple technology vocoder further comprises:
   a vocoder controller coupled to said call control resource manager and said selection manager, said selection manager selecting one of said first and second resource modules in response to a first control signal issued by said vocoder controller.

3. A base station controller comprising:
   a call control resource manager, said call control resource manager controlling exchanges of messages between at least one mobile terminal and a MSC;
   a multiple technology vocoder coupled to said call control resource manager, said multiple technology vocoder receiving, from said call control resource manager, messages being exchanged between said at least one mobile terminal and said MSC, said multiple technology vocoder comprising:
      a first resource module for performing D/A and A/D conversions for messages configured in accordance with a first technology;

a second resource module for performing D/A and A/D conversions for messages configured in accordance with a second technology;

a selection manager for selecting one of said first and second resource modules to perform D/A and A/D conversions on messages received from said call resource manager;

a reconfigurable buffer; and a buffer manager coupled to said call control resource manager, said selection manager, said reconfigurable buffer, and said vocoder controller, said buffer manager transmitting messages, received from said call control resource manager, to said selection manager using said reconfigurable buffer, said buffer manager regulating the transmission of messages received from said call control manager in response to a second control signal, issued by said vocoder controller, indicative of transmission characteristics of said technology to which said received messages correspond; said regulation including configuring said reconfigurable buffer to receive messages in said technology to which said received messages correspond; and a vocoder controller coupled to said call control resource manager and said selection manager, said selection manager selecting one of said first and second resource modules in response to a first control signal issued by said vocoder controller.

4. The base station controller of claim 1 wherein said first technology is TDMA and said second technology is CDMA.

5. The base station controller of claim 4 wherein said multiple technology vocoder is embodied within a DSP.

6. A telecommunications network comprising:

a mobile terminal configured for transmitting and receiving digital messages configured in accordance with a first protocol;

a first base station controller, said first base station controller capable of being coupled to said mobile terminal by a first airlink;

a second base station controller, said second base station controller directly linked to said first base station controller and capable of being coupled to said mobile terminal by a second airlink; and a MSC coupled to said first base station controller and said second base station controller, said MSC configured for transmitting and receiving analog messages configured in accordance with said first protocol;

said first base station controller including a vocoder for performing D/A and A/D conversions for messages configured in accordance with said first protocol, said vocoder comprising:

a first resource module for performing D/A and A/D conversions for messages configured in accordance with said first protocol;

a second resource module for performing D/A and A/D conversions for messages configured in accordance with a third protocol;

a selection manager for selecting one of said first and second resource modules to perform D/A and A/D conversions on messages transmitted by said MSC, said mobile terminal and said second base station controller, respectively, and received by said first base station controller;

first interface, said first interface coupled to receive messages originating at said mobile terminal and destined for said MSC; wherein said first interface comprises a first reconfigurable buffer and a first buffer manager, said first buffer manager configuring said first reconfigurable buffer to accept messages formatted in a selected one of said first and third protocols, said first buffer manager reconfiguring said first buffer each time a change in protocol is detected by said first base station controller; and a second interface, said second interface coupled to receive messages originating at said MSC and destined for said mobile terminal, wherein said second interface further comprises a second reconfigurable buffer and a second buffer manager, said second buffer manager configuring said second buffer to accept messages formatted in a selected one of said first and third protocols, said second buffer manager reconfiguring said second buffer each time a change in protocol is detected by said first base station controller, each one of said first and second resource modules being located between said first and said second interfaces;

said second base station controller including a vocoder for performing D/A and A/D conversions for messages configured in accordance with a second protocol but incapable of performing D/A and A/D conversions for messages configured in accordance with said first protocol;

wherein said vocoder for said first base station controller performs D/A and A/D conversions for messages being exchanged between said mobile terminal and said MSC when said mobile terminal is coupled to said first base station controller by said first airlink and wherein said second base station controller transfers messages being exchanged between said mobile terminal and said MSC to said first base station controller for D/A and A/D conversion thereby when said mobile terminal is coupled to said second base station controller by said second airlink.

7. A base station controller comprising:

a call control resource manager, said call control resource manager controlling exchanges of messages between a mobile terminal and a MSC; and a vocoder coupled to said call control resource manager, said vocoder receiving, from said call control resource manager, messages being exchanged between said mobile terminal and said MSC, said vocoder comprising:

a first interface, said first interface coupled to receive, from said call control resource manager, messages originating at said mobile terminal and destined for said MSC; and wherein said first interface comprises:

a first reconfigurable buffer; and a first buffer manager, said first buffer manager configuring said first buffer to accept messages formatted in a selected one of said first and second protocols in response to receipt of a first control signal issued by said vocoder controller, wherein said first buffer manager reconfigures said first buffer each time said vocoder controller detects a change in protocol;

a second interface, said second interface coupled to receive, from said call control resource manager, messages originating at said MSC and destined for said mobile terminal;

a first resource module, coupled to said first and second interfaces, for performing D/A and A/D conversions for messages configured in accordance with a first protocol;

a second resource module, coupled to said first and second interfaces, for performing D/A and A/D conversions for messages configured in accordance with a second protocol; and a vocoder controller coupled to said call control resource manager and said first and second interfaces, said vocoder controller configuring said first and second interfaces to handle messages of a selected one of said first and second protocols in response to information received from said call control resource manager.

8. The base station controller of claim 7 wherein said second interface further comprises:

a second reconfigurable buffer; and a second buffer manager;

said second buffer manager configuring said second buffer to accept messages formatted in a selected one of said first and second protocols in response to receipt of a second control signal issued by said vocoder controller;

wherein said second buffer manager reconfigures said second buffer each time said vocoder controller detects a change in protocol.

9. The base station controller of claim 8 wherein said vocoder further comprises:

a first selection manager, coupled to said first interface and said vocoder controller, for selecting one of said first and second resource modules to perform D/A conversions on messages received from said call resource manager, originating at said mobile terminal and destined for said MSC;

said first selection manager providing a path to said selected one of said first and second resource modules in response to a third control signal issued by said vocoder controller.

10. The base station controller of claim 9 wherein said vocoder further comprises:

a second selection manager, coupled to said second interface and said vocoder controller, for selecting one of said first and second resource modules to perform A/D conversions on messages received from said call resource manager, originating at said MSC and destined for said mobile terminal;

said second selection manager providing a path to said selected one of said first and second resource modules in response to a fourth control signal issued by said vocoder controller.

11. The base station controller of claim 10 wherein each one of said first and second protocols is a TDMA technology.

12. The base station controller of claim 10 wherein each one of said first and second protocols is a CDMA technology.

13. The base station controller of claim 10 wherein said first protocol is a TDMA technology and said second protocol is a CDMA technology.

14. The base station controller of claim 10 wherein said first protocol is a TDMA technology and said second protocol is a radio link protocol.

15. The base station controller of claim 10 wherein said first protocol is a CDMA technology and said second protocol is a radio link protocol.

16. A base station controller, comprising:

a call control resource manager, said call control resource manager controlling exchanges of messages between a mobile terminal and a MSC; and a vocoder coupled to said call control resource manager, said vocoder receiving, from said call control resource manager, messages being exchanged between said mobile terminal and said MSC;

said vocoder comprising:

a first interface, said first interface coupled to receive, from said call control resource manager, messages originating at said mobile terminal and destined for said MSC;

a second interface, said second interface coupled to receive, from said call control resource manager, messages originating at said MSC and destined for said mobile terminal;

a first resource module, coupled to said first and second interfaces, for performing D/A and A/D conversions for data configured in accordance with a first protocol;

a second resource module, coupled to said first and second interfaces, for performing D/A and A/D conversions for data configured in accordance with a second protocol;

a third resource module, coupled to said first and second interfaces, for performing D/A and A/D conversions for data configured in accordance with a third protocol;

a fourth resource module, coupled to said first and second interfaces, for performing D/A and A/D conversions for data configured in accordance with a fourth protocol;

a fifth resource module, coupled to said first and second interfaces, for performing D/A and A/D conversions for data configured in accordance with a fifth protocol;

a vocoder controller coupled to said call control resource manager and said first and second interfaces, said vocoder controller configuring said first and second interfaces to handle messages of a selected one of said first, second, third, fourth and fifth protocols in response to information received from said call control resource manager;

a first selection manager, coupled to said first interface and said vocoder controller, for selecting one of said first, second, third, fourth and fifth resource modules to perform D/A conversions on messages originating at said mobile terminal, received by said call resource manager and destined for said MSC, said first selection manager providing a path between said first selection manager and said selected one of said first, second, third, fourth and fifth resource modules in response to a first control signal issued by said vocoder controller; and a second selection manager, coupled to said second interface and said vocoder controller, for selecting one of said first, second, third, fourth and fifth resource modules to perform A/D conversions on messages originating at said MSC, received by said call resource manager and destined for said mobile terminal, said second selection manager providing a path between said second selection manager and said selected one of said first, second, third, fourth and fifth resource modules in response to a second control signal issued by said vocoder controller;

said first interface further comprising a first reconfigurable buffer and a first buffer manager, said first buffer manager configuring said first buffer to accept messages formatted in a selected one of said first, second, third, fourth and fifth protocols in response to receipt of a third control signal issued by said vocoder controller, said first buffer manager reconfiguring said first buffer each time said vocoder controller detects a change in protocol;

said second interface further comprising a second reconfigurable buffer and a second buffer manager, said second buffer manager configuring said second buffer to accept messages formatted in a selected one of said first, second, third, fourth and fifth protocols in response to receipt of a fourth control signal issued by said vocoder controller, said second buffer manager reconfiguring said second buffer each time said vocoder controller detects a change in protocol.

17. The base station controller of claim 16 wherein at least one of said first, second, third, fourth and fifth protocols is a TDAM technology and another one of said first, second, third, fourth and fifth protocols is a CDMA technology.

18. The base station controller according to claim 17 wherein said first protocol is EVRC, a CDMA technology, said second protocol is EFRC, a TDMA technology, said third protocol is RLP, an asynchronous technology, said fourth protocol is VSELP, a TDMA technology, and said fifth protocol is QCELP, a CDMA technology.

* * * * *